United States Patent
Matsumoto (10) Patent No.: US 9,520,693 B2
(45) Date of Patent: Dec. 13, 2016

(54) LASER PROCESSING MACHINE (71) Applicant: MURATA MACHINERY, LTD., Kyoto-shi, Kyoto (JP)

(72) Inventor: Keita Matsumoto, Inuyama (JP)

(73) Assignee: MURATA MACHINERY, LTD., Kyoto-shi (JP)

( * ) Notice: Subject to any disclaimer, the term of this patent is extended or adjusted under 35 U.S.C. 154(b) by 470 days.

(21) Appl. No.: 14/081,005

(22) Filed: Nov. 15, 2013

(65) Prior Publication Data

US 2014/0072003 A1  Mar. 13, 2014

Related U.S. Application Data

(63) Continuation of application No. PCT/JP2012/059143, filed on Apr. 4, 2012.

(30) Foreign Application Priority Data

May 19, 2011 (JP) .................................. 2011-112131

(51) Int. Cl.
*H01S 3/00* (2006.01)
*B23K 26/06* (2014.01)
(Continued)

(52) U.S. Cl.
CPC ............. *H01S 3/005* (2013.01); *B23K 26/046* (2013.01); *B23K 26/0648* (2013.01);
(Continued)

(58) Field of Classification Search
CPC combination set(s) only.
See application file for complete search history.

(56) References Cited

U.S. PATENT DOCUMENTS 5,029,964 A * 7/1991 Edwards ................ B23K 26/06
359/618
5,660,748 A * 8/1997 Tanaka ................... B23K 26/06
219/121.6
(Continued)

FOREIGN PATENT DOCUMENTS

JP  2000-084689 A  3/2000
JP  2001-179476 A  7/2001
(Continued)

OTHER PUBLICATIONS

Chinese Office Action dated Sep. 24, 2014, issued in corresponding Chinese Application No. 201280023543.4. (6 pages).
(Continued)

*Primary Examiner* — Dana Ross
*Assistant Examiner* — Renee Larose
(74) *Attorney, Agent, or Firm* — Westerman, Hattori, Daniels & Adrian, LLP (57) ABSTRACT

A laser processing machine includes a plurality of collimating lenses to convert a laser beam from a laser oscillator, which have been emerged from a point of emergence of a transmission optical fiber, into parallel rays of light, a condensing lens to condense the laser beam and then radiate it onto a work, and a nozzle positioned on one side of the work remote from the condensing lens. The distance from the point of emergence to the tip of the nozzle remains unchangeable. The collimating lenses are spaced from each other in a direction parallel to an optical axis. A switching device switches the position of each of the collimating lenses in the orthogonal direction so that the center of one of the collimating lenses may be aligned with a center of the laser beam. The collimating lenses have respective focal lengths that are different from each other.

6 Claims, 6 Drawing Sheets

(51) Int. Cl.
*B23K 26/04* (2014.01)
*G02B 7/16* (2006.01)

(52) U.S. Cl.
CPC ...... *B23K 26/0665* (2013.01); *B23K 26/1462* (2015.10); *G02B 7/16* (2013.01)

(56) References Cited

U.S. PATENT DOCUMENTS

| | | | | |
|---|---|---|---|---|
| 6,292,303 | B1* | 9/2001 | Hamar | G02B 27/144 33/286 |
| 7,495,838 | B2* | 2/2009 | Krneta | G02B 7/023 359/641 |
| 7,936,644 | B2* | 5/2011 | Boku | G11B 7/0935 369/112.26 |
| 2004/0114648 | A1* | 6/2004 | Nagano | H01S 5/405 372/36 |
| 2006/0222042 | A1* | 10/2006 | Teramura | G02B 7/025 372/101 |
| 2008/0031298 | A1* | 2/2008 | Sakai | B23K 26/0648 372/55 |
| 2008/0165405 | A1* | 7/2008 | Bruestle | B23K 26/046 359/223.1 |
| 2008/0169275 | A1* | 7/2008 | Koseki | B23K 26/02 219/121.75 |
| 2008/0253264 | A1* | 10/2008 | Nagatomi | G11B 7/1356 369/112.16 |
| 2010/0072180 | A1 | 3/2010 | Schuermann et al. | |
| 2011/0051590 | A1* | 3/2011 | Nagatomi | G11B 7/131 369/112.23 |
| 2011/0089149 | A1* | 4/2011 | Watanabe | B23K 26/1429 219/121.63 |

FOREIGN PATENT DOCUMENTS

| | | |
|---|---|---|
| JP | 2003-088984 A | 3/2003 |
| JP | 2009-113095 A | 5/2009 |
| JP | 2009-226473 A | 10/2009 |

OTHER PUBLICATIONS

Notification of Transmittal of Translation of the International Preliminary Report on Patentability (Form PCT/IB/338) of International Application No. PCT/JP2012/059143 mailed Dec. 5, 2013 with Forms PCT/IB/373 and PCT/ISA/237.
International Search Report dated Jun. 19, 2012, issued in corresponding application No. PCT/JP2012/059143.

* cited by examiner

PRIOR ART

LASER PROCESSING MACHINE

CROSS REFERENCE TO THE RELATED APPLICATION

This application is a continuation application, under 35 U.S.C §111(a) of international application No. PCT/JP2012/059143, filed Apr. 4, 2012, which claims priority to Japanese patent application No. 2011-112131, filed May 19, 2011, the entire disclosure of which is herein incorporated by reference as a part of this application.

BACKGROUND OF THE INVENTION

1. Field of the Invention

The present invention relates to a laser processing machine for use in, for example, sheet material processing or the like and, more particularly, to the technique of enabling a diameter of a beam incident on a condensing lens in the laser processing machine to be changed.

2. Description of Related Art

Figure 7:
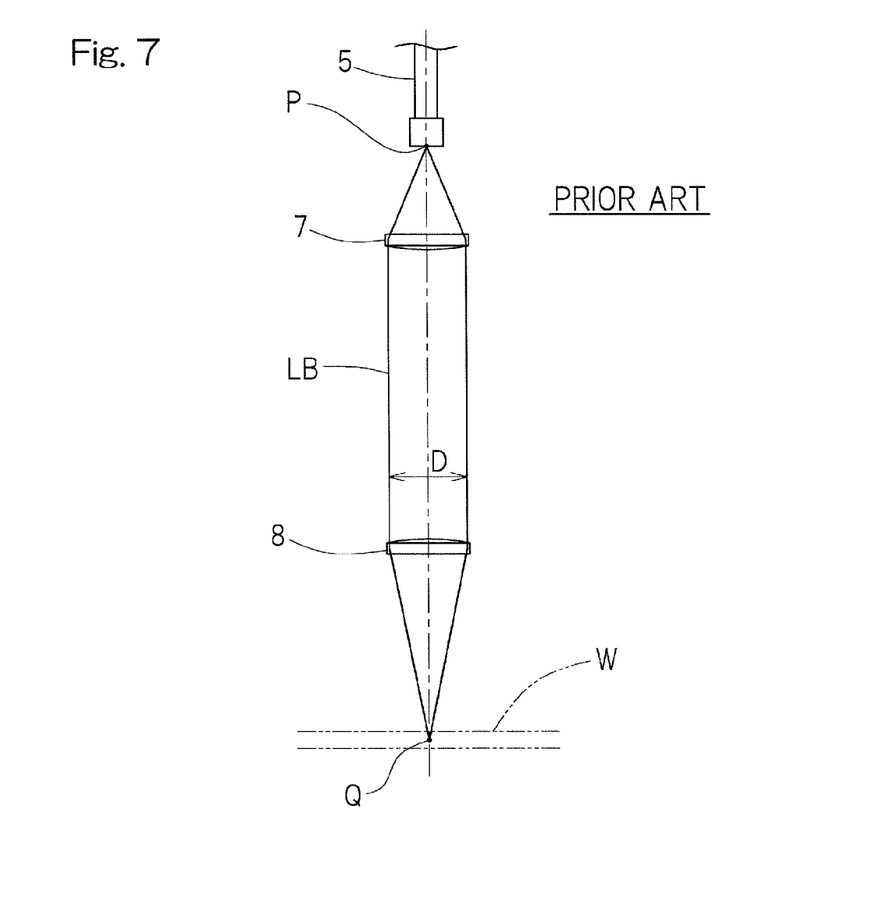
FIG. 7 is a diagram showing the optical system employed in the conventional laser processing machine.

The laser processing machine of a fiber light guide type is basically of a structure shown in FIG. 7 of the accompanying drawings. Referring to FIG. 7, a laser beam LB outputted from a laser oscillator emerges outwardly from a point of emergence P through a transmission optical fiber 5, is then condensed by a condensing lens 8 after having passed through a collimating lens 7 and is finally radiated onto a work W to be processed. Since the laser beam LB has an energy density that is high at a portion thereof where the beam diameter is small, the work W to be processed is processed at a location in the vicinity of a focal position (processing position) Q at which the beam diameter is minimal. Given the same angle of divergence of the laser beam LB from the point of emergence P, the beam diameters at the focal position Q, that is, spot sizes S1 and S2 (shown respectively in FIGS. 8A and 8B), and associated Rayleigh lengths R1 and R2 (similarly shown respectively in FIGS. 8A and 8B) are determined in dependence on the corresponding diameters D of the laser beam LB incident on the condensing lens 8 (the diameter of the laser beam LB incident on the condensing lens 8 being hereinafter referred to as "incident beam diameter"). Each of the Rayleigh lengths R1 or R2 is the distance as measured in the optical direction, which is about equal to $\sqrt{2}$ times of the radius of the associated minimum spot diameter S1 or S2 and the work W is desirably processed within this range.

Figure 8A:
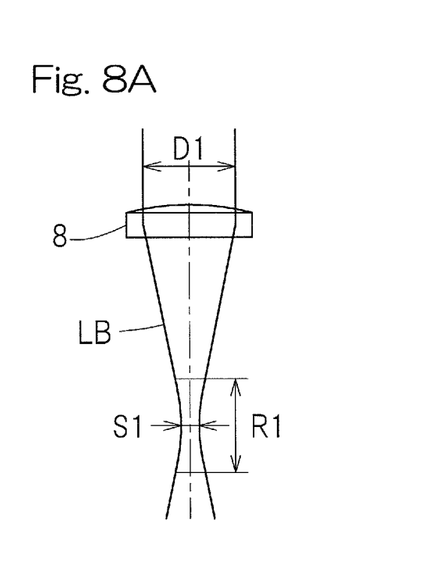
FIG. 8A is an explanatory diagram showing the spot diameter and the Rayleigh length which are exhibited when the beam diameter of the parallel rays of light is large.
Figure 8B:
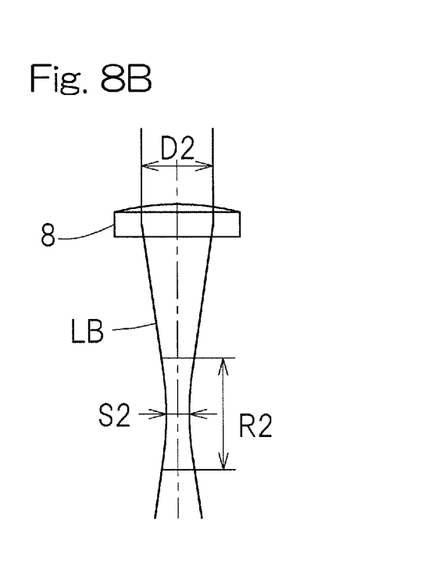
FIG. 8B is an explanatory diagram showing the spot diameter and the Rayleigh length which are exhibited when the beam diameter of the parallel rays of light is small.

FIGS. 8A and 8B illustrate respective diagrams showing the relation between the incident beam diameter and the spot diameter and the Rayleigh length. If as shown in FIG. 8A the incident beam diameter D1 is large, the spot diameter S1 is small and the Rayleigh length R1 is short. Conversely, if as shown in FIG. 8B, the incident beam diameter D2 is small, the spot diameter S2 is large and the Rayleigh length R2 is large. Accordingly, with respect to the sheet metal having a relatively small thickness, a processing with a high efficiency is performed with the large incident beam diameter and at the high energy density. With respect to the sheet metal having a relatively great thickness, if the incident beam diameter is reduced to a relatively small value, the processing can be enabled within the large Rayleigh length R2 even with the sheet metal of the great thickness although the energy density is low.

Following methods have hitherto been available to change the incident beam diameter.

One of those methods is to use, in a laser processing machine of a type utilizing a carbon dioxide gas laser oscillator as a laser beam source, a variable curvature mirror provided, separate from a plurality of transmission mirrors, on the laser beam transmission optical path leading from the oscillator to the condensing lens. By changing the curvature of the variable curvature mirror, the diameter of the laser beam incident on the condensing lens can be changed. In this respect, see, for example, the patent document 1 listed below.

Another one of the methods is to use a collimating lens intervened between the point of emergence and the condensing lens so that, by shifting the collimating lens in a direction parallel to the optical axis, the diameter of the laser beam incident on the condensing lens can be changed. In this respect, see, for example, the patent document 2 listed below. It is to be noted that the collimating lens is primarily used to convert laser rays of light, which have been diverged from the point of emergence, into parallel rays of light.

PRIOR ART LITERATURE

[Patent Document 1] JP Laid-open Patent Publication No. 2000-084689

[Patent Document 2] JP Laid-open Patent Publication No. 2009-226473

According to the above described method in which the variable curvature mirror is employed, a pressure is applied to one of opposite surfaces of the variable curvature mirror, which is not a reflective surface, but a surface on the rear side, to change convex and concave shapes of the rear side surface to thereby change the curvature of the variable curvature mirror. In order to change the variable curvature mirror to obtain desired concave and convex shapes, a pressure control is very complicated and it is also difficult to monitor the pressure applied to various portions of the variable curvature mirror.

Also, according to the second mentioned method in which the collimating lens is moved in the direction parallel to the optical axis, laser rays of light emitted as diverged from the point of emergence are not daringly converted into parallel rays as they pass through the collimating lens, but are allowed to be markedly converged or diverge to thereby change the incident beam diameter. For this reason, the distance from the point of emergence to the focal position also changes with a change of the incident beam diameter and, accordingly, the positional adjustment between the nozzle, positioned on one side of the condensing lens adjacent the work to be processed and the work becomes complicated.

SUMMARY OF THE INVENTION

In view of the foregoing, the present invention has for its primary object to provide a laser processing machine of a structure in which the distance from the point of emergence to the tip of a nozzle remains unchangeable, but which allows the spot diameter and the Rayleigh length at the focal position to be adjusted with a simplified structure.

The laser processing machine designed in accordance with the present invention will be summarized as follow with the aid of reference numerals employed in describing the present invention with reference to the accompanying drawings. The laser processing machine according to the present invention includes a collimating lens (7A, 7B) to convert a laser beam (LB) from a laser oscillator (1), which emerges from a point of emergence (P) of a transmission optical fiber (5), into parallel rays of light, a condensing lens (8) operable to collect the laser beam (LB), which has been converted into the parallel rays of light, and then to radiate onto a work (W) to be processed, and a nozzle (9) positioned on one side of the work (W) adjacent the condensing lens (8) and operable to discharge an assist gas, in which a distance from the point of emergence (P) to the tip of the nozzle (9) remains unchangeable. In such case, the collimating lens (7A, 7B) is provided in a plural number and those collimating lenses spaced from each other in an orthogonal direction perpendicular to the optical axis. A switching device (10) is provided to switch a position of each of the collimating lenses (7A, 7B) in the orthogonal direction so that an arbitrarily chosen one of the plurality of the collimating lenses (7A, 7B) may have a lens center thereof coinciding with the center (O) of the laser beam (LB) emitted from the point of emergence (P). The plurality of the collimating lenses (7A, 7B) have respective focal lengths that are different from each other. The drive of the switching device (10) may be performed either manually or automatically.

According to the above described construction, the laser beam (LB) diverged from the point of emergence (P) is converted into the parallel rays of light by the collimating lens (7A, 7B), and then the parallel rays, after having been condensed by the condensing lens (8), are radiated onto the work (W). By changing the position of each of the collimating lenses (7A, 7B) with the switching device (10) to thereby change the beam diameter of the parallel rays of light, the spot diameter (S1, S2) and the Rayleigh length (R1, R2) are changed.

Where the single collimating lens is shifted in the direction parallel to the optical axis such as disclosed in the patent document 2 referred to above, the laser beam emerging from the collimating lens does not form the parallel rays of light and, in order to allow the focal position to remain at the same position, the position of the condensing lens need be corrected incident to the positional adjustment of the collimating lens, and thus not only is a mechanism for the correction purpose needed, but the structure is also complicated, and an adjustment for that correction is laborious. However, according to the construction described above in connection with the present invention, by exchanging and using the plurality of the collimating lenses (7A, 7B) having different focal lengths, rendering the laser beam (LB), emerging from the collimating lens (7A, 7B), to be the parallel rays of light even after the exchange, and changing the beam diameter of the laser beam (LB) emerging from the collimating lens (7A, 7B), the spot diameter (S1, S2) and the Rayleigh length (R1, R2) on the focal position (Q) are altered. For this reason, only by changing the plurality of the collimating lenses (7A, 7B), the spot diameter (S1, S2) and the Rayleigh length (R1, R2) on the focal position (Q) can be altered without any positional adjustment of the condensing lens (8) being effected.

Also, without changing the distance from the point of emergence (P) to the tip of the nozzle (9), the spot size (S1, S2) and the Rayleigh length (R1, R2) on the focal position (Q) can be changed. For this reason, the structure becomes simplified. Thus, despite of the structure in which the distance from the point of emergence (P) to the tip of the nozzle (9) remains unchangeable, the spot size (S1, S2) and the Rayleigh length (R1, R2) on the focal position (Q) can be changed with that simplified structure.

In a preferred embodiment of the present invention, the laser processing machine may further include a storage unit (23) to store a processing condition and a predetermined one of the first and second collimating lenses (7A, 7B) in a fashion contrasted to each other, a selecting unit (24) to select the collimating lens (7A, 7B) which meets the processing condition upon checking the storage unit (23), and a switching control unit (25) to control a drive source (13) for the switching device (10) so that one of the collimating lenses (7A, 7B) selected by this selecting unit (24) may assume a position at which the laser beam (LB) emerging from the point of emergence (P) is converted into parallel rays of light.

With the laser processing machine so constructed as hereinabove described, the selecting unit (24) checks against the storage unit (23) regarding information on the processing condition and then selects the collimating lens (7A, 7B) that meets the processing condition. Subsequently, so that the selected collimating lens (7A, 7B) may be held at a position where the laser beam (LB) emerging from the point of emergence (P) is formed into parallel rays of light, the drive source (13) for the switching device (10) is controlled by the switching control unit (25). By so doing, selection of the collimating lens (7A, 7B) that meets the processing condition can be accomplished automatically.

In another preferred embodiment of the present invention, the laser processing machine may further include a detecting unit (14A, 14B) to detect a position of the collimating lens (7A, 7B), of which position in the orthogonal direction is switched by the switching device (10) and which has been positioned on the optical axis of the laser beam (LB); and an emergency responsive unit (26) to implement a predetermined emergency responsive measure in the event that a lens center of the collimating lens (7A, 7B) detected by the detecting unit (14A, 14B) does not coincide with a position of a center (O) of the laser beam (LB) emerging from the point of emergence (P). The emergency responsive measure is such as, for example, issuing a warning, halting the operation, re-switching the collimating lens (7A, 7B).

According to the structure, in the event that the position of the collimating lens (7A, 7B) is not proper, the emergency responsive measure is implemented in such a way that, for example, a warning is issued, the operation is halted or the switching of the collimating lens (7A, 7B) is again performed.

In a further preferred embodiment of the present invention, the laser processing machine may further include a focal position changing mechanism (15) to alter a focal position (Q) of the laser beam (LB) by moving the condensing lens (8) in a direction parallel to the optical axis of the laser beam (LB). According to this structural feature, since respective actuating directions of the condensing lens (8) and the collimating lens (7A, 7B) are in one direction, respective structures of the focal position changing mechanism (15) to actuate the condensing lens (8) and the switching device (10) to actuate the collimating lens (7A, 7B) are simplified.

In a still further preferred embodiment of the present invention, the laser processing machine may further include a lens holder (11) to hold the plurality of the collimating lenses (7), in which case the switching device (10) switches the position in the orthogonal direction by moving the lens holder (11) in the orthogonal direction.

In a yet further preferred embodiment of the present invention, the laser processing machine may further includes a lens holder (11) to hold the plurality of the collimating lenses (7), in which case the switching device (10) switches the position in the orthogonal direction by rotating the lens holder (11) about a rotation axis (32a) that lies parallel to the optical axis.

Any combination of at least two constructions, disclosed in the specification and/or the accompanying drawings should be construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF PREFERRED EMBODIMENTS

Figure 1:
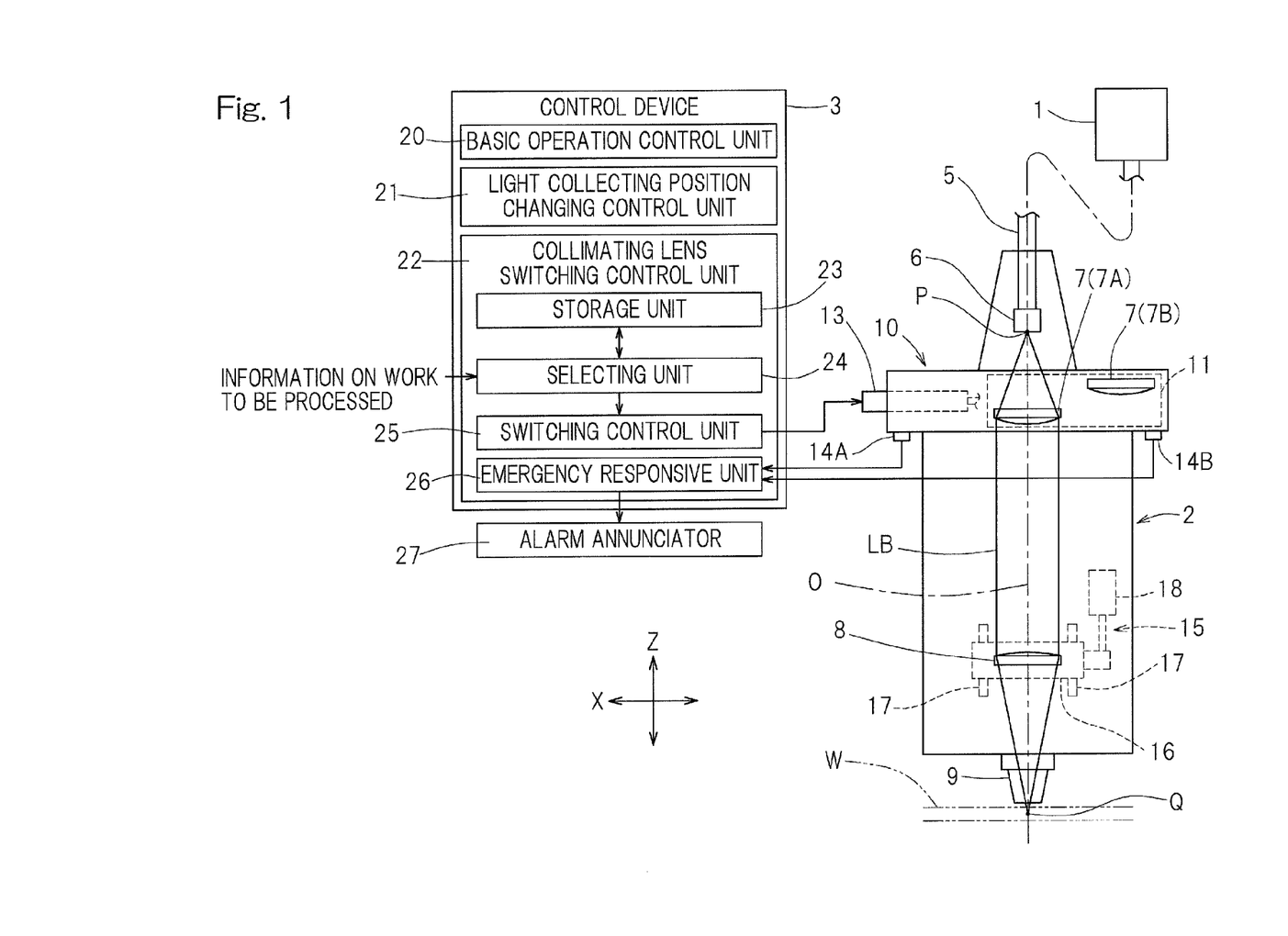
FIG. 1 is a diagram showing a conceptual diagram illustrating a laser processing machine designed in accordance with a first preferred embodiment of the present invention, which diagram is shown together with a unit diagram illustrative of a control system.

A first preferred embodiment of the present invention will be described with particular reference to FIGS. 1 to 4A and 4B. As shown in FIG. 1, a laser processing machine embodying the present invention includes a laser oscillator 1, a processing machine head 2 and a control device 3.

The laser oscillator 1 is comprised of, for example, a solid state laser oscillator and a laser light oscillated by the laser oscillator 1 is transmitted to an emission member 6, provided in the processing machine head 2, through a transmission optical fiber 5. It is to be noted that the laser oscillator 1 may be a semiconductor laser oscillator. The processing machine head 2 includes, in addition to the emission member 6 referred to above, a collimating lens 7 operable to convert a laser beam LB, converged and emitted from a point of emergence P of the emission member 6, into parallel rays of light, and a condensing lens 8 for condensing the laser beam LB, which has been converted into the parallel rays of light, and then radiating it onto a work W to be processed. The emission member 6 is provided at a tip of the transmission optical fiber 5 and the point of emergence P thereof defines a point of emergence of the transmission optical fiber 5. At a lower end of the processing machine head 2, there is provided a nozzle 9 for discharging a high speed gas or an assist gas, which is used to blow off a metal melted by the laser beam LB. For the assist gas, any of oxygen gas, nitrogen gas and argon gas, for example, is used. The nozzle 9 referred to above is positioned below the condensing lens 8, that is, on one side adjacent the work W to be processed. It is to be noted that the emission member 6 referred to above may not be essential and may therefore be dispensed with occasionally.

The collimating lens 7 is employed in a plural number, for example, two in the illustrated embodiment, for changing a beam diameter of the parallel rays of light, the plurality of, that is, two collimating lenses having focal lengths different from each other. The first and second collimating lenses 7A and 7B are disposed having been offset relative to each other in an orthogonal direction (X-axis direction) which is perpendicular to the optical axis of the laser beam LB and respective positions thereof in a direction (Z-axis direction) parallel to the optical axis are rendered to be the position at which the laser beam LB emerging from the point of emergence P is converted into the parallel rays of light, when a center of each of the first and second collimating lenses 7A and 7B coincides with a center O of the laser beam LB.

Figure 2A:
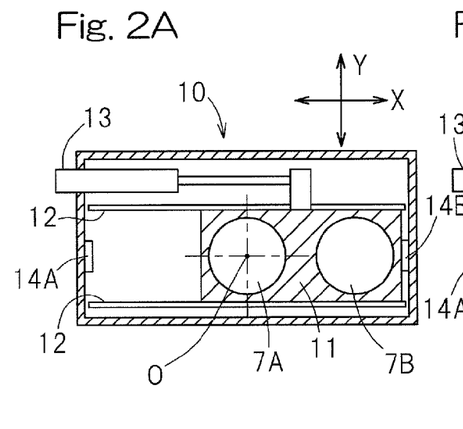
FIG. 2A is a horizontal sectional view showing a switching mechanism of the laser processing machine held in one condition.
Figure 2B:
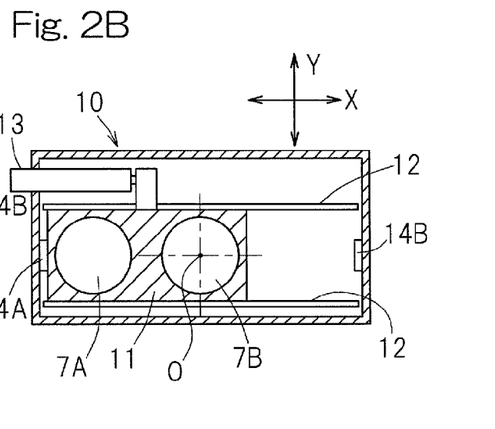
FIG. 2B is a horizontal sectional view showing a switching mechanism of the laser processing machine held in a different condition.

The first and second collimating lenses 7A and 7B are switched in position by a switching device 10 in the X-axis direction. The switching device 10 includes, as best shown in FIGS. 2A and 2B, a common lens holder 11 to which the first and second collimating lenses 7A and 7B are fitted, a pair of X-axis rails 12 for guiding the lens holder 11 in the X-axis direction, and switching drive source 13 for selectively advancing or retracting the lens holder 11 in the X-axis direction perpendicular to the Z-axis direction. The switching drive source 13 is, for example, an air cylinder. As shown in FIG. 2A, when the switching drive source 13, which can be the air cylinder, is actuated to advance, the center of the first collimating lens 7A having a long focal length coincides with the center O of the laser beam LB. On the other hand, as shown in FIG. 2B, when the switching drive source 13 is actuated to retract, the center of the second collimating lens 7B having a short focal length coincides with the center O of the laser beam LB.

At opposite ends of the range of distance of movement of the lens holder 11, a pair of first and second detecting units 14A and 14B, each in the form of, for example, a proximity switch or the like, are provided. When and so long as the center of the first collimating lens 7A is held in coincidence with the center O of the laser beam LB, one of the detecting units, for example, the first detecting unit 14A detects the lens holder 11 and is therefore switched on. On the other hand, when and so long as the center of the second collimating lens 7B is held in coincidence with the center O of the laser beam LB, the second detecting unit 14B detects the lens holder 11 and is therefore switched on. It is to be noted that respective positions of the first and second collimating lenses 7A and 7B may be made detectable by, for example, a linear scale or the like.

Due to the individual characteristics of the laser oscillator 1, it occurs that the laser beam LB may occasionally have a somewhat different characteristic. Also, the first and second collimating lenses 7A and 7B have different curvatures or the like due to the individual characteristics. Because of those differences, a focal position Q as will be detailed later may vary. In order to compensate for a variation of the focal position Q, a fine adjusting mechanism is desirably employed for finely adjusting the respective positions of the first and second collimating lenses 7A and 7B in a direction parallel to the optical axis (Z-axis direction) and, also, the respective positions thereof in a plane (X-Y plane) orthogonal to the optical axis. It is, however, to be noted that only the positions in the Z-axis direction may be made finely adjustable and/or the positions thereof in the X-Y plane may be made finely adjustable. The fine adjusting mechanism may be so designed and so configured, for example, that first and second lens mounting members (not shown), which the first and second collimating lenses 7A and 7B are respectively fitted to or otherwise mounted on, can be finely adjusted by means of a screw mechanism or the like.

Also, as shown in FIG. 1, the processing machine head 2 is provided with a focal position changing mechanism 15 for changing the focal position Q of the laser beam LB by moving the condensing lens 8 in a direction (Z-axis direction) parallel to the optical axis of the laser beam LB. This focal position changing mechanism 15 includes a lens holder 16 having the condensing lens 8 fitted thereto, a pair of Z-axis rails 17 along which the lens holder 16 is moved in the Z-axis direction, and a selective advance or retraction drive source 18 for selectively advancing or retracting the lens holder 16 in the Z-axis direction. For the selective advance or retraction drive source 18 may be employed in the form of, for example, a servomotor.

Referring to FIG. 1, the control device 3 includes a basic operation control unit 20 for controlling a movement of the processing machine head 2 and an output of the laser oscillator 1, a focal position changing control unit 21 for controlling the selective advance or retraction drive source 18 for the focal position changing mechanism 15, and a collimating lens switching control unit 22 for controlling the switching drive source 13 for the switching device 10. Also, the collimating lens switching control unit 22 in turn includes a storage unit 23, a selecting unit 24, a switching control unit 25 and an emergency responsive unit 26.

The storage unit 23 referred to above stores therein a plurality of processing conditions corresponding to each of the first and second collimating lenses 7A and 7B. The processing condition includes, for example, the material of the work W to be processed, the plate thickness of the work W and so on.

The selecting unit 24 referred to above is operable to select one of the first and second collimating lenses 7A and 7B, which meets with the processing condition, by checking information on the processing condition against the storage unit 23. The information on the processing condition may be supplied either from the outside or from the basic operation control unit 20.

The switching control unit 25 referred to above issues an output command to the drive source 13 for the switching device 10 so that the first collimating lens 7A or the second collimating lens 7B, which has been selected by the selecting unit 24, can be held at a position at which the laser beam LB emerging from the point of emergence P of the transmission optical fiber 5 is converted into the parallel rays of light, that is, the center of either one of the first and second collimating lenses 7A and 7B coincides with the center O of the laser beam LB.

The emergency responsive unit 26 referred to above is operable to implement a predetermined emergency responsive measure in the event that the position of one of the first and second collimating lenses 7A and 7B, which has been detected by the corresponding detecting unit 14A or 14B, is not in position at which the laser beam LB emerging from the point of emergence P is converted into the parallel rays of light. In the illustrated embodiment now under discussion, as the emergency responsive measure, an output is given to an alarm annunciator 27 to allow the latter to issue a warning. Other than that, any of such emergency responsive measures as halting an operation of the laser processing machine, performing another switching operation to switch one of the first and second collimating lenses 7A to 7B over to the other thereof, or anything like that may be implemented.

The laser processing machine of the structure described above is so designed and so configured that the laser beam LB diverging and emerging from the point of emergence P is converted by the first collimating lens 7A (or the second collimating lens 7B) into the parallel rays of light and the laser beam LB, which has been converted into the parallel rays of light, is condensed by the condensing lens 8 before it is radiated onto the work W. With the position of the condensing lens 8 changed by the focal position changing mechanism 15 in the direction (Z-axis direction) parallel to the optical axis of the laser beam LB, the focal position Q of the laser beam LB is changed.

Figure 3A:
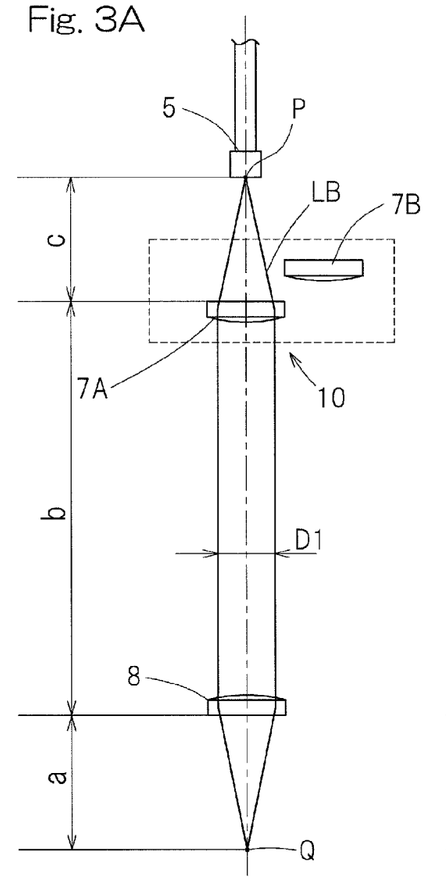
FIG. 3A is a diagram showing an optical system of the laser processing machine, illustrating parallel rays of light having a certain diameter.
Figure 3B:
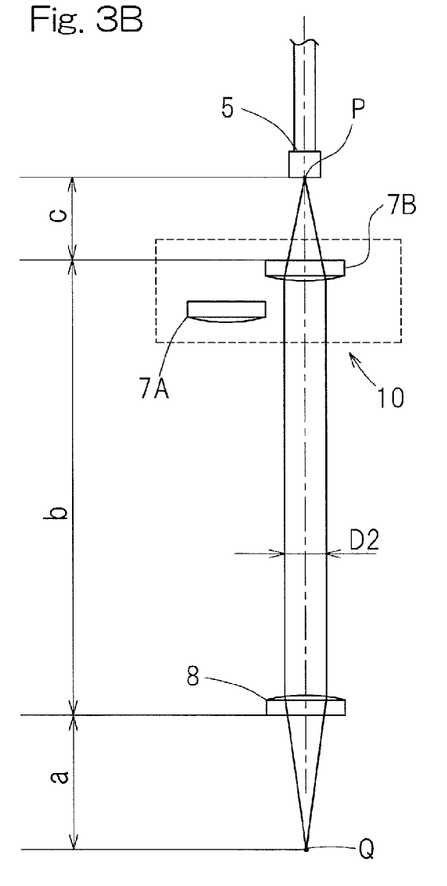
FIG. 3B is a diagram showing an optical system of the laser processing machine, illustrating the parallel rays of light having a different diameter.
Figure 4A:
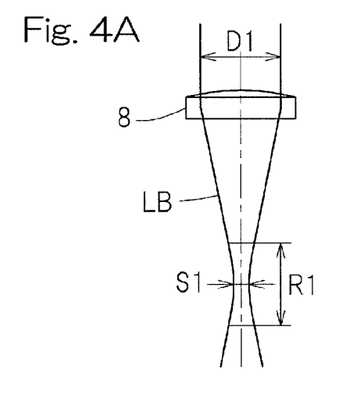
FIG. 4A is an explanatory diagram showing the spot diameter and the Rayleigh length which are exhibited when the beam diameter of the parallel rays of light is large.
Figure 4B:
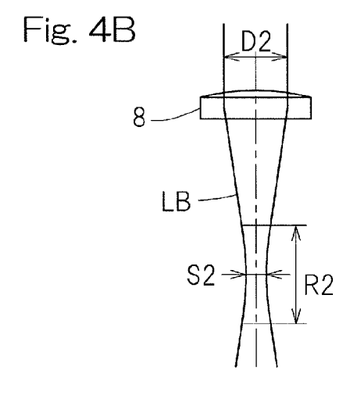
FIG. 4B is an explanatory diagram showing the spot diameter and the Rayleigh length which are exhibited when the beam diameter of the parallel rays of light is small.

Also, by switching the respective positions of the first and second collimating lenses 7A and 7B by means of the switching device 10 to thereby change the beam diameter D1 and D2 of the parallel rays of light as shown in FIGS. 3A and 3B, the spot diameter and the Rayleigh length are altered. Where the beam diameter D1 of the parallel rays of light is large as shown in FIG. 4A in which the first collimating lens 7A is utilized, the spot diameter S1 is small and the Rayleigh length R1 is short. Conversely, where the beam diameter D2 of the parallel rays of light is small as shown in FIG. 4B in which the second collimating lens 7B is utilized, the spot diameter S2 is large and the Rayleigh length R2 is long. For comparison purposes, various dimensions when the beam diameter of the parallel rays of light is large and that is small are shown in the following Table 1.

TABLE 1

|  | Dia. of Emergence Point | Beam Dia. of Parallel Light Rays | Distance from Condensing Lens to Focal Position | Distance from Collimating Lens to Condensing Lens | Focal Length of Collimating Lens | Spot Diameter |
| --- | --- | --- | --- | --- | --- | --- |
| 7A | 100 μm | D1 = 20 mm | a = 190 mm | b = 100.8 mm | c = 125 mm | S1 ≈ 0.15 mm |
| 7B | 100 μm | D2 = 16 mm | a = 190 mm | b = 125.8 mm | c = 100 mm | S2 = 0.19 mm |

As discussed above, the change of the focal position Q is carried out by moving the condensing lens 8 in the direction parallel to the optical axis (the Z-axis direction) and the change of each of the spot diameter and the Rayleigh length is carried out by performing the positional switching of the first and second collimating lenses 7A and 7B in the direction (in the X-axis direction) orthogonal to the optical axis. In other words, the condensing lens 8 and the first and second collimating lenses 7A and 7B are moved in only one direction. For this reason, respective structure of the focal position changing mechanism 15 and the switching device 10 for actuating (driving) the first and second collimating lenses 7A and 7B are simple.

Also, the laser beam LB diverged and emerged from the point of emergence P is neither converged nor diverged by any of the first and second collimating lenses 7A and 7B such as disclosed in the previously mentioned patent document 2, but the laser beam LB having passed through any of the collimating lenses 7A and 7B is rendered to be the parallel rays of light. The corresponding spot diameter S1 and S2 and the associated Rayleigh length R1 and R2 are changed by altering the beam diameter of the parallel rays. For this reason, the positional switching of the first and second collimating lenses 7A and 7B for the purpose of changing the spot diameter S1 and S2 and the Rayleigh length R1 and R2 does not affect the focal position Q of the laser beam LB from the condensing lens 8 and, hence, no positional adjustment of the collecting lens 8 incident to the positional switching of the first and second collimating lenses 7A and 7B is required. Accordingly, the change of the spot diameter S1 and S2 and the Rayleigh length R1 and R2 on the focal position Q can be accomplished with a simplified structure.

Figure 5:
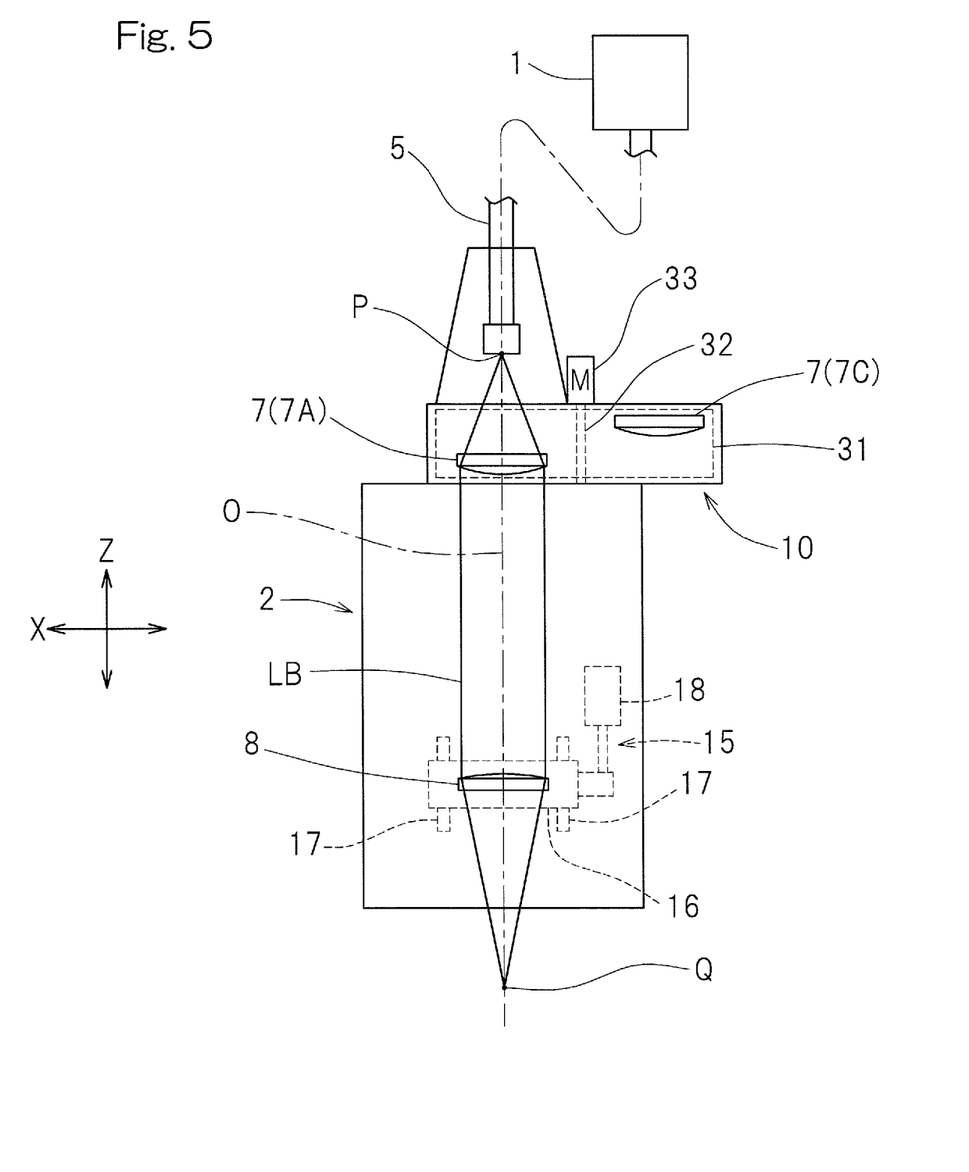
FIG. 5 is a conceptual diagram showing the laser processing machine designed in accordance with a second preferred embodiment of the present invention.
Figure 6:
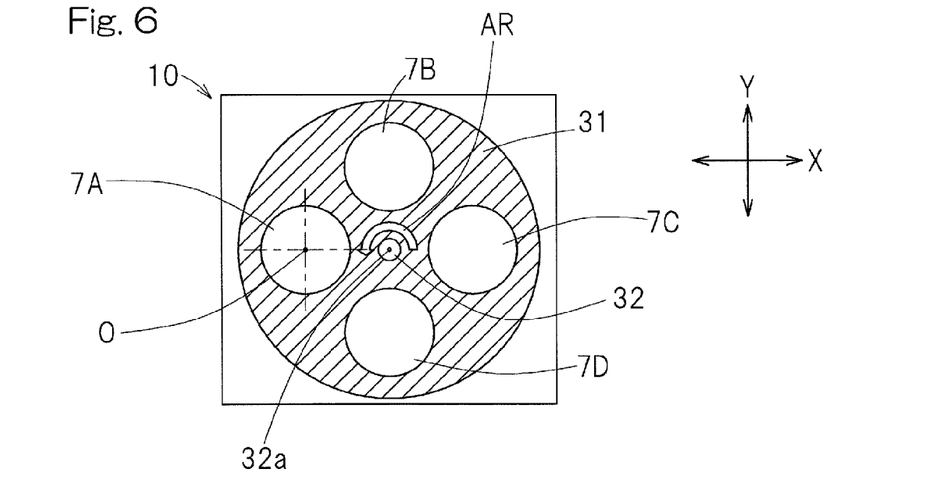
FIG. 6 is a horizontal sectional view of the switching mechanism employed in the laser processing machine of FIG. 5.

FIGS. 5 and 6 illustrate a second preferred embodiment of the present invention. The laser processing machine shown therein differs from the laser processing machine according to the previously described first embodiment in respect of the the number of the collimating lenses 7 and the structure of the switching device 10. Other structural features than those mentioned above are similar to those employed in the first embodiment shown in and described with reference to FIGS. 1 to 4.

The laser processing machine shown in FIGS. 5 and 6 makes use of four, i.e., first, second, third and fourth collimating lenses 7A, 7B, 7C and 7D in order to change the beam diameter of the parallel rays of light, those collimating lenses having respective focal lengths that are different from each other. The first to fourth collimating lenses 7A to 7D are disposed equidistantly in a circumferential direction and the position of each of them in a direction parallel to the optical axis (in Z-axis direction) is rendered to be a position at which, when the center of it coincides with the center O of the laser beam LB, the laser beam LB emerging from the point of emergence P is rendered to be the parallel rays of light.

The switching device 10 includes a lens holder 31 which is round in shape when viewed from top and has the first to fourth collimating lenses 7A to 7D fitted thereto, a rotary shaft 32 rotatable together with the lens holder 31 and positioned at the center of the circumference on which the first to fourth collimating lenses 7A to 7D are arranged, and a rotary drive source 33 such as, for example, a motor or the like for rotating the rotary shaft 32. The rotary shaft 32 has a rotation axis 32a that lies parallel to the direction parallel to the optical axis (the Z-axis direction). FIG. 6 illustrates a condition in which the center of the first collimating lens 7A is aligned with the center O of the laser beam LB, that is, the first collimating lens 7A is held at a position at which the laser beam LB emerging from the point of emergence P is converted into the parallel rays of light. Respective positions of the first to fourth collimating lenses 7A to 7D are switched one at a time so that, each time the lens holder 31 is rotated 90°, starting from the condition described above and shown in FIG. 6, in a leftward direction shown by the arrow AR, that is, in a counterclockwise direction as viewed in FIG. 6, the second, third and fourth collimating lenses 7B, 7C and 7D can be held sequentially in this order at a position at which the parallel rays are formed.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

[Reference Numeral]
1 . . . Laser oscillator
5 . . . Transmission optical fiber
7, 7A, 7B, 7C, 7D . . . Collimating lens
8 . . . Condensing lens
9 . . . Nozzle
10 . . . Switching device
11 . . . Lens holder
14A, 14B . . . Detecting unit
15 . . . Focal position changing mechanism
23 . . . Storage unit
24 . . . Selecting unit
25 . . . Switching control unit
26 . . . Emergency responsive unit
32a . . . Rotation axis
LB . . . Laser beam
O . . . Center
P . . . Point of emergence
Q . . . Focal position
W . . . Work to be processed

What is claimed is:

1. A laser processing machine comprising:
a plurality of collimating lenses which convert a laser beam from a laser oscillator into parallel rays of light, the laser beam emerging from a point of emergence of a transmission optical fiber, the plurality of collimating lenses being spaced from each other in an orthogonal direction perpendicular to an optical axis;
a condensing lens operable to collect the laser beam, which has been converted into the parallel rays of light, and then to radiate the collected laser beam onto a work to be processed;
a nozzle positioned on one side of the work adjacent the condensing lens and operable to discharge an assist gas, a distance from the point of emergence to a tip of the nozzle being unchangeable; and
a switching device which switches a position of the plurality of collimating lenses in the orthogonal direction so that an arbitrarily chosen one of the plurality of the collimating lenses may have a lens center thereof coinciding with the center of the laser beam emitted from the point of emergence,
wherein the plurality of the collimating lenses have respective focal lengths that are different from each other.

2. The laser processing machine as claimed in claim 1, further comprising:
- a storage unit which stores a plurality of processing conditions corresponding to each of the plurality of collimating lenses;
- a selecting unit which selects a collimating lens among the plurality of collimating lenses which meets the processing which correspond to a selected processing condition, upon checking the storage unit; and
- a switching control unit which controls a drive source for the switching device so that one of the plurality of collimating lenses selected by the selecting unit may assume a position at which the laser beam emerging from the point of emergence is converted into parallel rays of light.

3. The laser processing machine as claimed in claim 1, further comprising:
- a detecting unit which detects a position of a collimating lens among the plurality of collimating lenses, of which a position in the orthogonal direction is switched by the switching device and which has been positioned on the optical axis of the laser beam; and
- an emergency responsive unit which implements a predetermined emergency responsive measure in the event that a lens center of the collimating lens detected by the detecting unit does not coincide with a position of a center of the laser beam emerging from the point of emergence.

4. The laser processing machine as claimed in claim 1, further comprising a focal position changing mechanism which alters a focal position of the laser beam by moving the condensing lens in a direction parallel to the optical axis of the laser beam.

5. The laser processing machine as claimed in claim 1, further comprising a lens holder which holds the plurality of the collimating lenses,
- wherein the switching device switches the position in the orthogonal direction by moving the lens holder in the orthogonal direction.

6. The laser processing machine as claimed in claim 1, further comprising a lens holder which holds the plurality of the collimating lenses,
- wherein the switching device switches the position in the orthogonal direction by rotating the lens holder about a rotation axis that lies parallel to the optical axis.

* * * * *